United States Patent
Ogasawara et al.

(10) Patent No.: US 9,312,530 B2
(45) Date of Patent: Apr. 12, 2016

(54) BATTERY CONNECTION MEMBER AND BATTERY CONNECTION BODY

(71) Applicant: Yazaki Corporation, Tokyo (JP)

(72) Inventors: Shigeyuki Ogasawara, Makinohara (JP); Katsunori Sato, Makinohara (JP); Kiyotaka Yamashita, Shimada (JP)

(73) Assignee: Yazaki Corporation, Tokyo (JP)

( * ) Notice: Subject to any disclaimer, the term of this patent is extended or adjusted under 35 U.S.C. 154(b) by 283 days.

(21) Appl. No.: 13/975,706

(22) Filed: Aug. 26, 2013

(65) Prior Publication Data

US 2013/0344377 A1    Dec. 26, 2013

Related U.S. Application Data

(63) Continuation of application No. 13/696,993, filed as application No. PCT/JP2011/059493 on Apr. 18, 2011.

(30) Foreign Application Priority Data

May 11, 2010    (JP) .................................. 2010-109054

(51) Int. Cl.
*H01M 10/46*    (2006.01)
*H01M 2/20*    (2006.01)
(Continued)

(52) U.S. Cl.
CPC .............. *H01M 2/206* (2013.01); *H01M 2/263* (2013.01); *H01M 2/30* (2013.01); *H01M 2220/20* (2013.01)

(58) Field of Classification Search
CPC ..... H02J 7/0013; H02J 7/1423; H02J 7/0042; H02J 7/355
USPC ...... 320/107, 112, 116; 174/68.1, 72 B, 99 B
See application file for complete search history.

(56) References Cited

U.S. PATENT DOCUMENTS

| 6,275,003 | B1 | 8/2001 | Marukawa et al. |
| 6,614,203 | B2* | 9/2003 | Yuasa ................. B60R 16/0238 320/104 |
| 8,058,842 | B2* | 11/2011 | Kai ..................... B60L 11/1861 320/116 |

FOREIGN PATENT DOCUMENTS

| JP | 2001-057196 A | 2/2001 |
| JP | 2001-110395 A | 4/2001 |

(Continued)

OTHER PUBLICATIONS

Notification of Reasons for Refusal mailed Jul. 1, 2014, issued for the corresponding Japanese patent application No. 2010-109054 and English translation thereof.

(Continued)

*Primary Examiner* — Edward Tso
(74) *Attorney, Agent, or Firm* — Locke Lord LLP; James E. Armstrong, IV; Brian S. Matross

(57) ABSTRACT

Prevention of interference between an electric wire and a terminal in a wiring part, and downsizing of the wiring part are achieved. A battery connection member, includes a plurality of housings accommodating a bus bar connecting in series a plurality of batteries, and one or more terminals electrically connected to the bus bar; and a wiring part arranged in parallel along the plurality of housings in a direction intersecting a connecting direction of the electric wire relative to the terminals. The wiring part includes: a communication part formed to communicate with inside the wiring part, and positioning an end of a swaging part of the terminal therein; and an electric wire protection part continuing to the communication part, projecting toward inside the wiring part, and formed to prevent contact of the terminal positioned inside the communication part and the electric wire connected to the other terminal.

4 Claims, 6 Drawing Sheets

(51) Int. Cl.
*H01M 2/26* (2006.01)
*H01M 2/30* (2006.01)

(56) References Cited

FOREIGN PATENT DOCUMENTS

| JP | 2004-098295 A | 4/2004 |
| JP | 2011-008957 A | 1/2011 |
| JP | 2011-077031 A | 4/2011 |
| WO | WO-2011/021614 A1 | 2/2011 |

OTHER PUBLICATIONS

International Search Report dated May 24, 2011, issued for PCT/JP2011/059493.

* cited by examiner

BATTERY CONNECTION MEMBER AND BATTERY CONNECTION BODY

TECHNICAL FIELD

This invention relates to a battery connection member and a battery connection body having the battery connection member, the battery connection member including a plurality of housings accommodating a bus bar connecting in series a plurality of batteries, and one or more terminals electrically connected to the bus bar, and a wiring part arranged in parallel along the plurality of housings in a direction intersecting a connecting direction of the electric wire relative to the terminals, the wiring part having the electric wire bent near swaging part of the terminal wired therewithin.

BACKGROUND ART

For example, to an electric vehicle running using electric motor, or a hybrid vehicle running in conjunction with engine and electric motor is mounted the aforementioned battery device as a drive source for the power source device. For the power source a battery connection plate as shown in the PTL 1 is employed.

In FIG. 6, a battery connection plate 100 is attached to a battery collectivity formed such that batteries each having positive electrode at one end and negative electrode at the other (square battery) are alternately and oppositely stacked, and connects the stacked batteries to each other in series. The battery connection plate 100 is provided with a resin plate formed using mold, a bus bar 116 with one hole fitted into such one end 108 of the resin plate 107, a bus bar 117 with two holes fitted into one end 109 of the resin plate.

Wiring a power line to the battery connection plate 100, and a protection part 120 to a signal line enables attachment to the battery collectivity. A terminal of the power line end is, at this time, attached to contact the bus bar 116 having single hole. Likewise, an end terminal of a plurality of signal lines is attached to contact the bus bar 117 having two holes.

The battery connection plate 100 includes a protection part 120 protecting the signal to be wired. The protection part 120 is provided with a plurality of wiring grooves 123 wiring the signal line, and a plurality of groove covers 125 engaging with each of plurality of wiring grooves 123 via a hinge 124. After the signal is wired to the plurality of wiring grooves 123, the hinge 124 is press-bent to lay the groove cover 125 to the wiring groove 123, then the wiring groove 123 and the groove cover 124 are engaged to each other, so as to complete the protection part 120.

CITATION LIST

Patent Literature

[PTL 1]
Japanese Patent Application Laid-Open Publication No. 2004-98295

SUMMARY OF INVENTION

Technical Problem

Notwithstanding, in the aforementioned battery connection plate 100, the signal line is bent from a swaging portion of the plurality of terminals 118 electrically connected to each of the plurality of bus bars 117 to be wired to the plurality of wiring grooves 123, it has been likely that the signal line connected to the other terminal 118 is contacted with the swaging part of the terminal 118. Thereby, the plurality of signal lines wired within the wiring groove 123 has been thereby required to avoid the terminal 118, making it difficult to downsize the wiring groove 123. Also, failure of downsizing the wiring groove 123 has caused the battery connection plate 100 to upsize, so as to increase material or mold cost.

Accordingly, object of the present invention is, in light of the above problem, to provide a battery connection member and a battery connection body preventing interference of electric wire wired within the wiring part and the terminal, and downsizing the wiring part.

Solution to Problem

In order to attain the above-mentioned object, a battery connection member according to a first aspect of the present invention, includes: (a) a plurality of housings accommodating a bus bar connecting in series a plurality of batteries, and one or more terminals electrically connected to the bus bar; and (b) a wiring part arranged in parallel along the plurality of housings in a direction intersecting a connecting direction of the electric wire relative to the terminals, wherein the electric wire bent near swaging part of the terminal is wired within the wiring part, the wiring part including: (i) a communication part formed to communicate with inside the wiring part, and positioning an end of the swaging part of the terminal therein; and (ii) an electric wire protection part continuing to the communication part, projecting toward inside the wiring part, and formed to prevent contact of the terminal positioned inside the communication part and the electric wire connected to the other terminal.

According to the first aspect of the present invention, accommodation of the bus bar and the terminal within the housing makes the terminal of the swaging part positioned in the communication part of the wiring part. While the electric wire connected to the terminal is bent near the swaging part of the terminal so as to be wired within the wiring part, in the communication part where the other terminal in wiring pathway is positioned, the electric wire protection part is projected toward inside the wiring part, preventing contact of the other terminal and the wired electric wire.

Preferably, in the battery connection part of the first aspect, the electric wire protection part is formed plurally in number at both sides of the communication part in an extension direction of the wiring part.

According to the present invention, the plurality of electric wire protection parts formed at both sides of the communication part in the extension direction of the wiring part, even if the electric wire is wired in any direction of the wiring part, prevents any contact of the terminal and the wired electric wire. Also, it is made possible for the electric wire protection part to restrict wiring toward the other terminal when the electric wire connected to the terminal is wired to the wiring part.

According a second aspect of the present invention, a battery connection body attached to a plurality of batteries in which positive and negative electrodes alternately and oppositely are stacked to each other, and which connects in series the plurality of batteries to each other, the battery connection body includes: (a) the battery connection member according to the first aspect; (b) a plurality of bus bars accommodated in the housing of the battery connection member, and connecting in series the plurality of batteries; (c) a plurality of terminals electrically connected to each of the bus bars, and accommodated in the housing; (d) one or more electric wires electrically connected to the terminal, and wired inside the wiring part of the battery connection member.

According to the battery connection body of the invention, the plurality of the battery connection member connects in series the plurality of batteries to each other, and is accommodated in the housing with the bus bar and the terminal electrically connected. The electric wire connected to the terminal is bent near the swaging part of the terminal so as to be wired to the wiring part, and contact of the electric wire to be wired and the other terminal in wiring pathway is prevented by the electric wire protection part communicating with the communicating part of the other terminal.

Advantageous Effects of Invention

According to the invention, since contact of the electric wire and the terminal within the wiring part of the battery connection member is prevented by the electric wire protection part, it is made possible to wire the electric wire near the terminal in the wiring part, enabling to downsize the wiring part. It is also made possible to prevent contact of the electric wire by the electric wire protection part when the end of the terminal projects into the wiring part resulting from assembling error between the housing and the terminal. Therefore, downsizing of the battery connection member allows contributing reduction of material and molding cost.

According to the invention, in addition to the advantageous effects of the first aspect of the invention, it is made possible to have a degree of flexibility of directions for the electric wire in the wiring part, as well as to securely prevent contact of the plurality of electric wires and the plurality of terminals wired in the wiring part. Restriction of wiring of the electric wire bent from the terminal by the electric wire protection part toward the other terminal can also contribute efficiency of wiring work.

DESCRIPTION OF EMBODIMENTS

Hereinafter, one embodiment of a battery connection member and a battery connection body relevant to the present invention is discussed with reference drawings of FIGS. 1 to 5.

Figure 1:
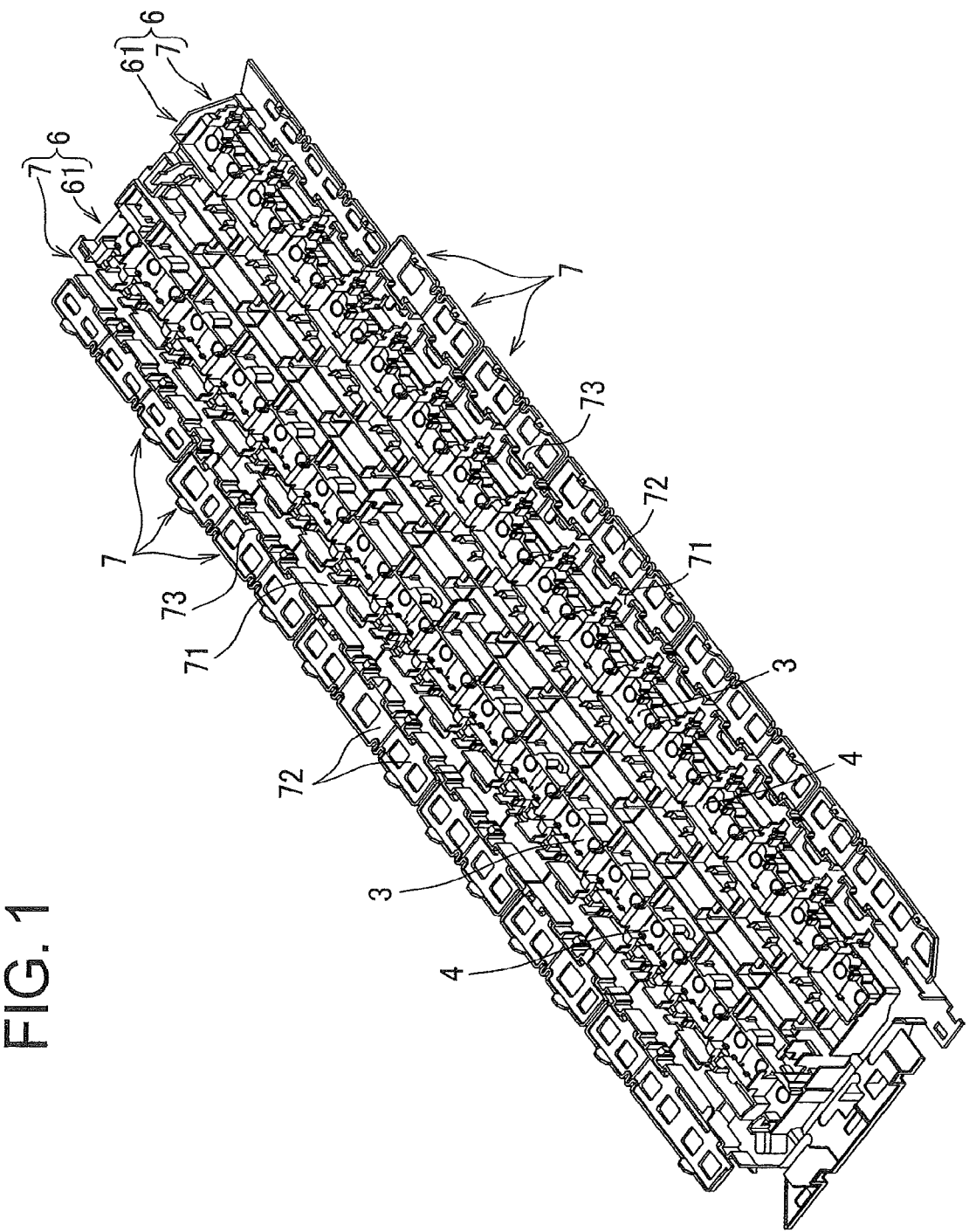
FIG. 1 is a perspective view illustrating an opening state of a wiring part of a battery connection member.
Figure 2:
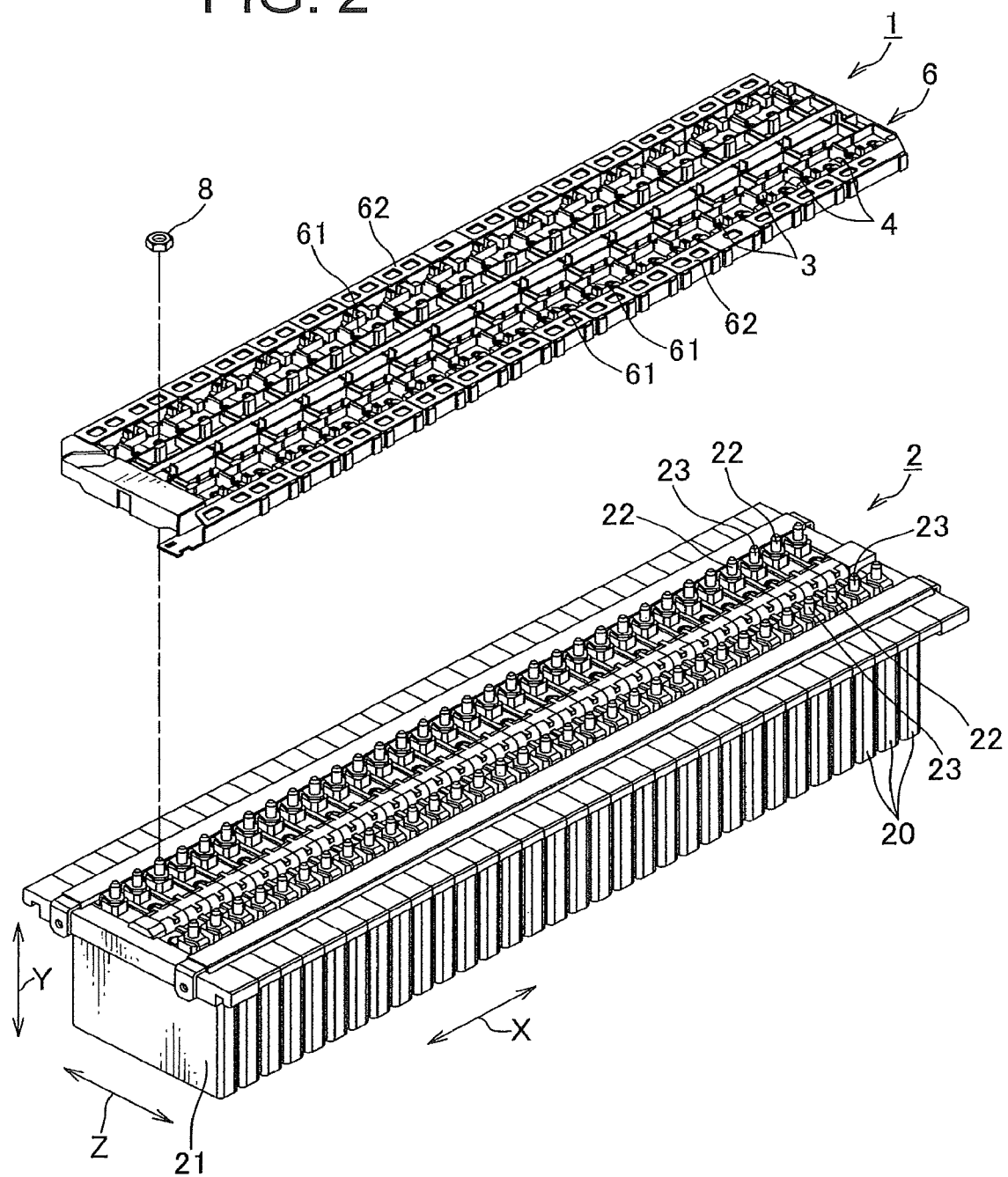
FIG. 2 is an exploded view of a power source device composed of a battery connection body including the battery connection member and a battery collectivity.

As shown in FIGS. 1 and 2, a battery connection body 1 of the present invention is attached to a battery collectivity 2, which composes a power source device. Also, the power source device is mounted in such an electric vehicle running using an electric motor, or a hybrid vehicle running in conjunction with an engine and an electric motor, which is designed to supply power with the electric motor. Note that the battery collectivity is formed such that batteries (square battery) each having positive electrode at one end and negative electrode at the other are alternately and oppositely stacked to each other.

The battery collectivity 2, as shown in FIG. 2, is provided with a plurality of batteries 20, and a fixture (not shown) that fixes the plurality of batteries 20 stacked to each other. Each of the plurality of batteries 20 is provided with a positive electrode 22 and a negative electrode 23 projecting from one end of an upper face of the battery main body 21 and the other end, respectively.

The plurality of batteries 20 is stacked such that the positive electrode 22 and the negative electrode 23 are straightly and alternately arranged in a stacking direction of the batteries 20. Also, an arrow X in FIG. 2 indicates the stacking direction of the batteries and a longitudinal direction of the battery collectivity 2, an arrow Z a width direction of each of the batteries, i.e., a width direction of the battery collectivity 2, and an arrow Y a height direction of each of the batteries 20, i.e., a height direction of the battery collectivity 2. Also, the battery collectivity 2 is mounted in the vehicle in such a direction that the height direction (that is, the arrow Y direction) is arranged parallel to direction of gravitational force. Namely, in a state of the battery collectivity 2 being mounted in the vehicle, an upper side along the arrow Y direction in FIG. 2 is made an upper side of the direction of gravitational force, a lower side along the arrow Y direction a lower side. Also, in the state of the battery collectivity 2 being mounted in the vehicle, the aforementioned positive electrode 22 and the negative electrode 23 project from the upper face of the battery main body 21 of each of the batteries in the arrow Y direction.

The battery connection body 1 is provided with a plurality of bus bars 3, a plurality of terminals 4 stacked to each other so as to be connected with the bus bars 3, a plurality of electric wires 5 connected to each terminal 4, and a synthetic resin battery connection member 6 accommodating the above.

Figure 3:
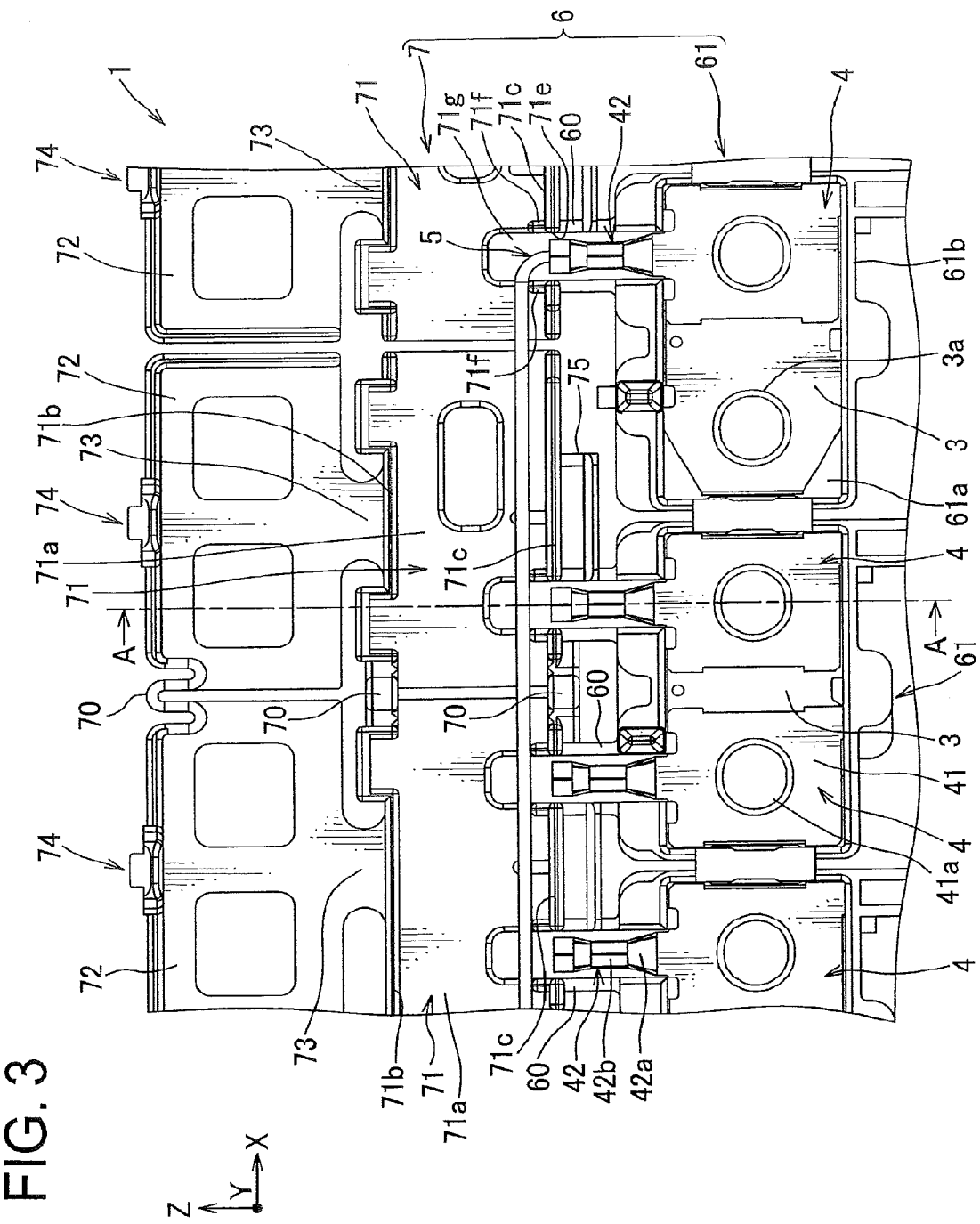
FIG. 3 is a partial enlarged top view enlarging in partial the battery connection body including the battery connection.

The bus bar 3 is obtained to press-form metal plate for example, which as shown in FIG. 3, is provided with a plate-like metal plate including a pair of bus bar holes 3a passing the positive electrode 22 and the negative electrode 23 therethrough that neighbor each other. Through one of a pair of bus bars 3a is passed the positive electrode 22 disposed on one of the battery 20 neighboring each other, through the other the pair of bus bars 3a is passed the negative electrode 23 disposed on the other of the battery neighboring each other, and the bus bar 3 is thereby attached to these positive electrode 22 and the negative electrode 23, as well as is electrically connected to these positive electrode 22 and the negative electrode 23. Also, the bus bar 3 is fixed to the battery 20 by a nut 8 (see FIG. 2) being threaded into the positive electrode 22 and the negative electrode 23 that are passed through the bus bar 3a.

The terminal 4 is obtained by press-forming of metal plate, which, as shown in FIG. 3, is integrally provided with a bus bar connection part 41 and an electric wire connection part 42.

The bus bar connection part 41 is plate-shaped, which is provided with a communication part 41a through which one of the positive and negative electrodes 22, 23 is passed. This bas bar connection part 41 with one of the positive and the negative electrodes therethrough is stacked on the bas bar 3 so as to be electrically connected to the bas bar 3.

The electric wire connection part 42 is formed continuous to the bus bar connection part 41, provided with a bottom plate 42a positioning the electric wire 5 on a surface thereof, and a pair of swaging pieces 42b each upstanding from both ends of the bottom plate 42a in its width direction, and swaging an insulating coat of an end of the electric wire 5 so as to fix, and electrically being connected to, the electric wire 5. The electric wire connection part 42 corresponds to the swaging part of the terminal 4, which extends toward a direction generally normal to the longitudinal direction of the wiring part 71 of the battery connection member 6 (the arrow X direction) from the bus bar connection part 41.

The electric wire 5 is provided with conductive core wire, and insulating synthetic resin coat covering the core wire. The electric wire 5 is connected to an electric wire connection part 42 of the terminal, one end of which is accommodated in the housing 61, and wired within the wiring part 71 of the battery connection member 6, and the other end is connected to such a not-shown voltage detection circuit.

Then, the battery connection member 6 is formed into a generally rectangular shape nearly equal to that of a top of the battery collectivity 2, which is stacked onto the top of the battery connectivity 2. The battery connection member 6 is provided with a plurality of housings 61 accommodating each of bas bars 3 and of terminals stacked onto the bas bar, and arranged spaced from each other in the arrow X direction, and a electric wire wiring member 7 extending toward in a arrangement direction of the plurality of housings 61, extending parallel to, but spaced from, the plurality of housings 61, and accommodating the plurality of electric wires 5 connected to the each terminal 4. The plurality of housings 61 and the plurality of electric wire wiring members 7 are connected with the communication member 60 so as to be integrally formed.

While there will be discussed a case in which in the battery connection member 6, a plurality of housings 61 arranged spaced from each other in the arrow X direction, and a plurality of electric wire wiring members 7 are each disposed in two lines in the arrow Z direction, it is understood that instead, various modifications such as to be disposed in one line are possible.

Each housing 61 as shown in FIG. 3, is box-shaped capable of each bus bar 3 being fitted thereinto by a bottom wall 61a positioning each bus bar 3 thereon, and a peripheral wall 61b upstanding from edges of the bottom wall 61a. Each housing 61 accommodates each bus bar 3 and each terminal 4 stacked onto the bus bar 3. The bottom wall 61a is provided with a pair of battery connection member holes capable of passing the positive and negative electrodes 22 and 23 of the battery 20. Also, the plurality of housings 61 is arranged spaced from each other in a stack direction of the plurality of batteries 20, i.e., the arrow X direction. A disposition relative to the positive and the negative electrodes 22, 23 of the battery 20 is thereby absorbed.

The plurality of electric wire wiring members 7 as shown in FIGS. 1 to 3, is arranged in parallel in an arrangement direction of the plurality of housings 61, i.e., the arrow X direction. The plurality of electric wire wiring members 7 is arranged spaced from each other in the same manner as the plurality of housings 61, and any adjacent electric wire wiring members are connected to each other by connection hinges 70. A disposition relative to the positive and the negative electrodes 22, 23 of the battery 20 is thereby absorbed.

Figure 4:
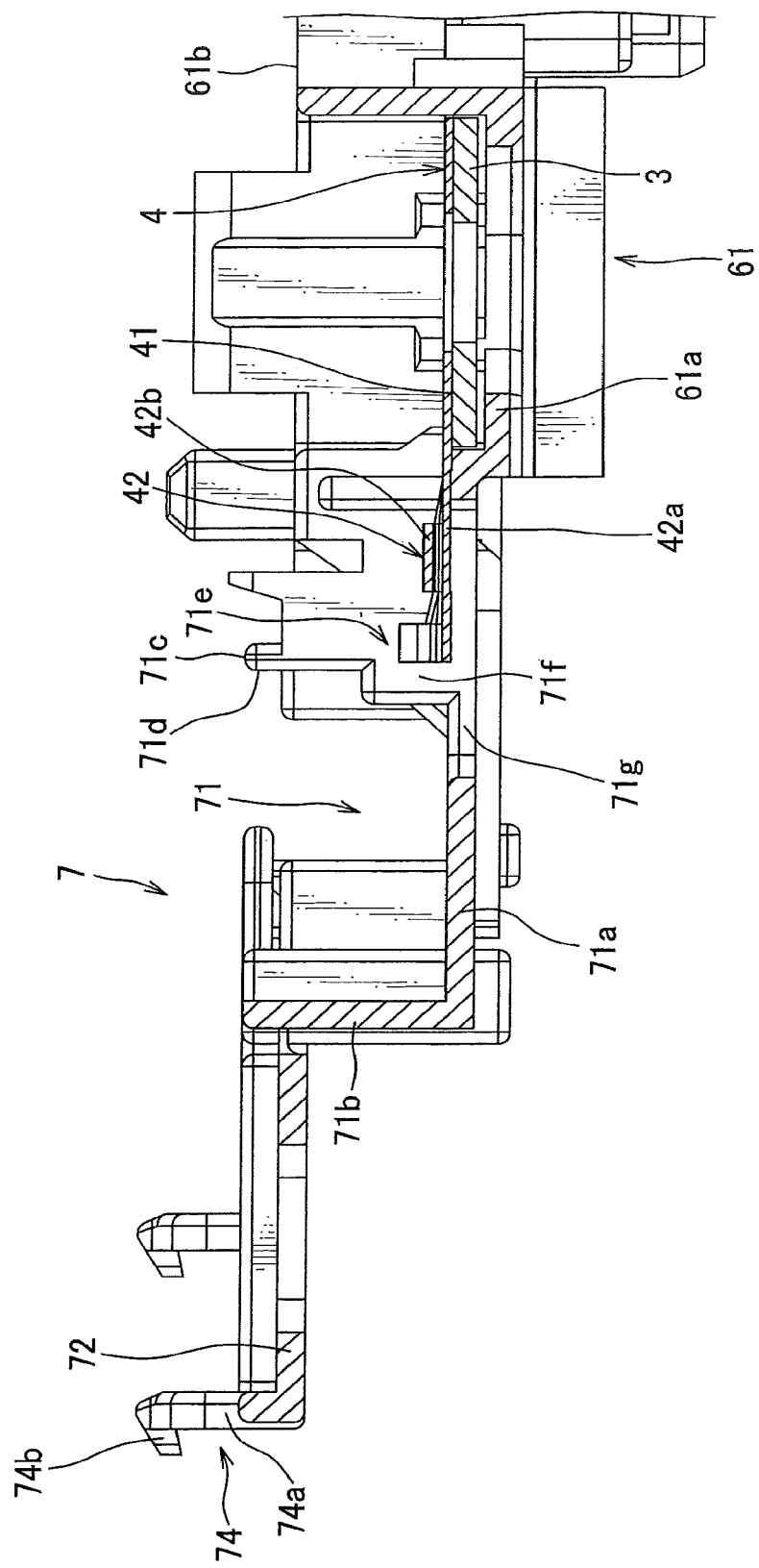
FIG. 4 is a cross-sectional view illustrating a cross-section taken from A-A line and viewed from its arrow direction in FIG. 3.
Figure 5:
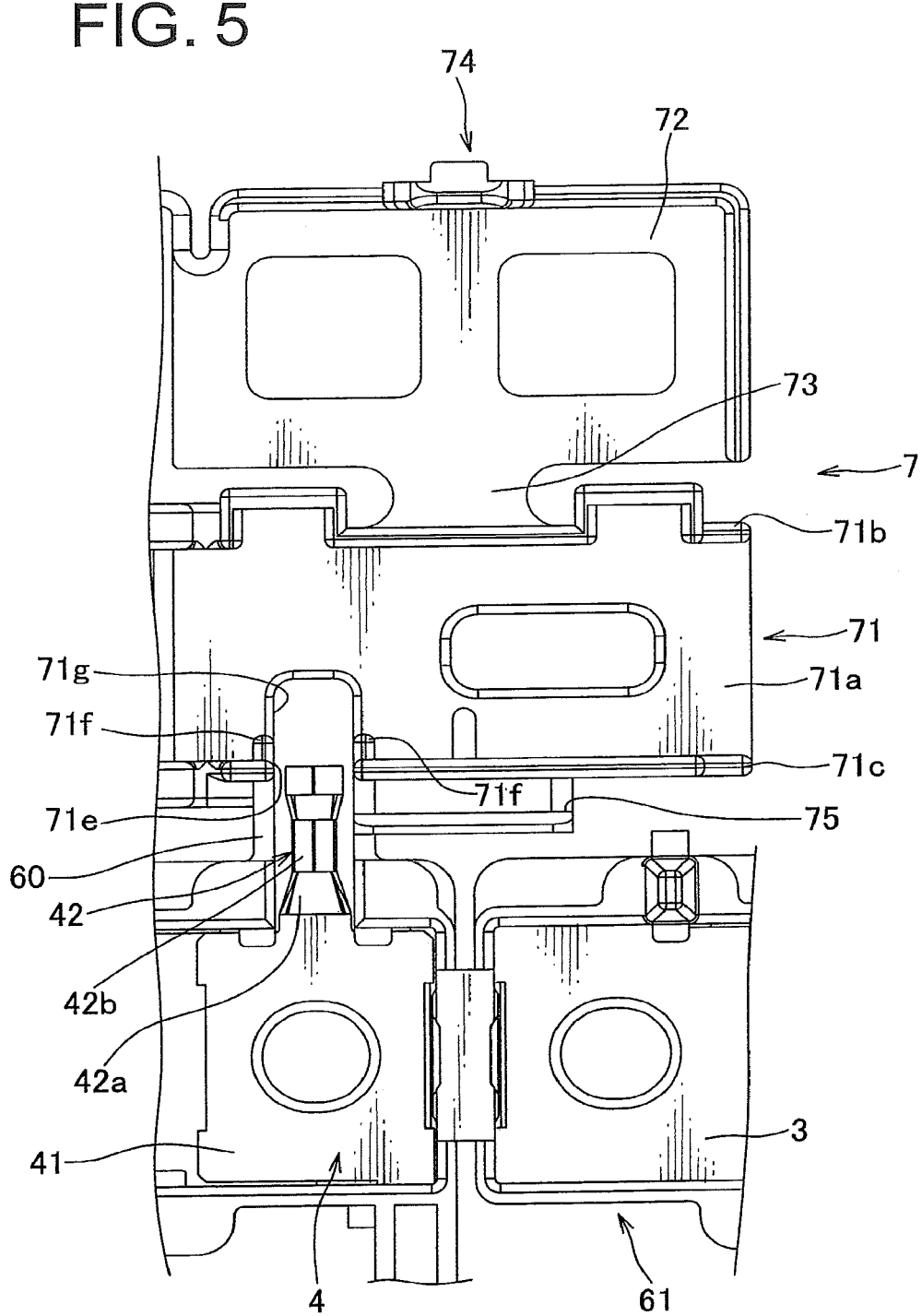
FIG. 5 is an enlarged view enlarging one of the battery connection members.
Figure 6:
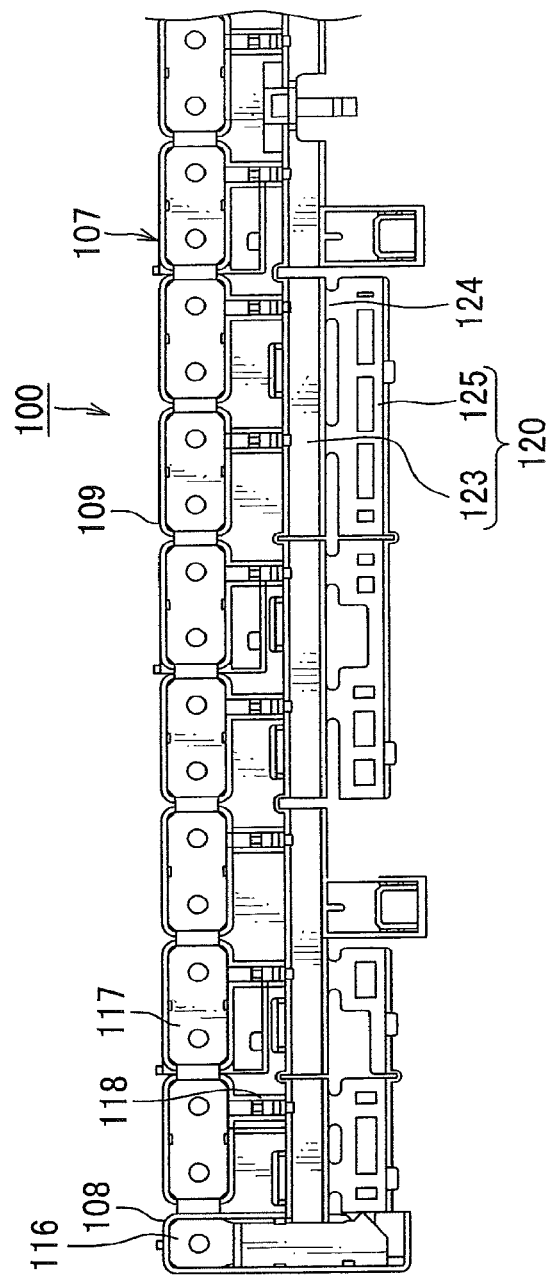
FIG. 6 is a top view illustrating one example of a conventional battery connection plate.

The electric wire wiring member 7, as shown in FIGS. 3 to 5, is formed integral with a wiring part 71, a cover 72, a hinge 73, an engagement part 74, and an engagement receipt part 75.

Within the wiring part 71, the electric wire 5 electrically connected to the terminal 4 accommodated in the aforementioned battery connection member 6 is wired. The wiring part 71 is provided with a bottom wall 71a, a pair of side wall 71b, 71c, an opening 71d, communication part 71e, an electric wire protection part 71f, and a hole 71g, and is integrally formed of the above.

The bottom wall 71a is plate-shaped, extending in an arrangement direction of the housings 61 (the arrow X direction in the figure). A pair of side walls 71b, 71c upstands from an outer edge opposite to the bottom wall 71a. The wiring part 71 is gutter-shaped in cross-sectional nearly U shape in its width direction, i.e., in the arrow Z direction by the bottom wall 71a and the pair of side walls 71b, 71c. The opening 71d is arranged between ends of the pair of side walls 71b, 71c, from which the electric wire 5 is inserted toward the wiring part 71.

The communication part 71e, as shown in FIGS. 3 to 5, is disposed near the bottom wall 71a of the side wall 71c opposite to the housing 61, which is a through hole communicating with the wiring part 71, and which positions an end of the electric connection part 42 of the terminal 4 accommodated in the housing 61. Note that the communication part 71e is not limited to a through hole but may be what accommodates the electric wire connection part 42 of the terminal 4, and thereby may be formed on the side wall 71c as a slit for example.

The electric wire protection part 71f is a rib that is formed continuous with the communication part 71e, projecting toward inside the wiring part 71. The electric wire protection part 71f is formed plurally at both sides of the communication part 71e in its extension direction, i.e., the arrow X direction. The electric wire protection direction 71f is formed higher than the terminal 4 positioned in the communication part 71e. In light of various errors such as assembling error relative to the housing 61 of the terminal 4, or manufacturing error of the terminal 4, the electric wire protection part 71f, is formed to project toward inside the wiring part 71 further than the maximum of the errors when the electric wire connection part 42 of the terminal 4 projects inside the wiring part 71.

As such the electric wire protection part 71f is formed to prevent the terminal 4 positioned at the communication part 71e and the electric wire 5 connected to the other terminal 4 from contacting. Also, forming the electric wire protection part 71f at both sides of the communication part 71e makes both directions of the arrow X into wiring directions of the wiring part 71, enabling to have a degree of flexibility of wiring directions for the electric wire 5 in the wiring part 71, as well as to securely prevent the plurality of electric wires wired within the wiring part 71 and the plurality of terminals 4 from contacting. Also, the electric wire protection part 71f restricts the electric wire 5 bent from the terminal 4 to be wired toward the other terminal 4, contributing efficiency of wiring work.

Note that the electric wire protection part 71f of the present embodiment is made a pair of ribs but instead may be horseshoe-shaped so as to cover the communication part 71e. Also, at an upper side of the wiring direction the electric wiring protection part 71f is formed when the direction of the electric wire 5 is limited to one direction.

The hole 71g is formed in the bottom wall 71a toward inside the wiring part 71 from the communication part 71e. The wiring part 71 is arranged such that the communication part 71e is formed plurally or singly, and the bottom wall 71a is provided with a through hole when the communication part 71e is formed singly.

The cover 72 is formed into such a shape as to cover the opening 71d of the wiring part 71. The hinge 73 is formed across the side wall 71b of one side of the wiring part 71 and the cover 72. The hinge 73 connects the cover 72 to the wiring part 71 operable to open and close relative to the opening 71d of the wiring part 71. The hinge 73 of the present embodiment makes the wiring part 71 or the cover 72 rotatable from an open state in which the opening 71d of the wiring part 71 is opened to a closed state in which the opening 71d is closed by the cover 72.

The engagement part 74 upstands from an end of the cover 72 such as to cover near an upper end of the side wall 71c of the other side of the wiring part 71 when the cover 72 is positioned in the closed state. The engagement part 74 is provided with an arm 74a, and an engagement projection 74b at near a tip of the arm 74a, projecting toward outside the wiring part 71.

The engagement receipt part 75 is formed along near an upper end of the side wall 71c of the wiring part 71. The engagement receipt part 75 forms a space capable of passing the engagement part 74 therethrough between the side walls 71c. Engagement of the engagement projection 74b of the engagement part 74 through the space with a lower end of the engagement receipt part 75 allows keeping the closed state in which the opening 71d of the wiring part 71 is closed by the cover 72.

Hereinafter, there will be discussed one example for assembling work of making the power source device by attaching the aforementioned battery connection body 1 to a terminal face (an upper face in FIG. 2) of the battery collectivity 2.

The battery connection body 1, as shown in FIG. 2, is stacked onto the terminal face of the battery collectivity 2, and is attached to the battery collectivity 2 by threading the nut 8 into the positive electrode 22 and the negative electrode 23 that are sequentially passed through each of the holes of the battery connection member 6, the bus bar 3, and the terminal 4. Then, as shown in FIG. 3, after electrical connection of the terminal 4 each accommodated in the plurality of housing 61 of the battery connection member 6 with the electric wire 5, the electric wire 5 is bent toward near the electric wire protection part 71f along the housing 61, and is inserted into inside the wiring part 71 from the opening 71d of the plurality of electric wire wiring members 7, resulting in the plurality of electric wires 5 being wired within the wiring part 711. At this time, while the electric wire 5 is wired in its wiring direction along the side wall 71c of the wiring part 71 near the housing 61, the electric wire connection part 42 of the terminal 4 in wiring pathway is covered by the electric wire protection part 71f of the wiring part 71, preventing the electric wire to be wired and the terminal 4 (the other terminal) in wiring pathway from contacting.

After wiring the electric wire 5, pressing the cover 72 of the electric wire wiring member 7 by such a worker moves the cover 72 about the hinge 73 toward the opening 71d of the wiring part 71. Then, engagement of the engagement part 74 with the engagement receipt part 75 makes the wiring part 71 into the closed state in which the cover 72 is closed, completing assembling work after these steps are worked for all electric wire wiring member 7.

According to the battery connection body 1 as mentioned above, since it is made possible to prevent the electric wire 5 and the terminal 4 from contacting in the wiring part 71 of the wiring connection member 6 by the electric wire protection part 71f, the electric wire 5 is wired near the terminal 4 in the wiring part 71 solely by forming the electric wire protection part 71f in the communication part 71e of the wiring part 71, leading to downsizing of the wiring part 71. Also, when the end of the terminal 4 projects in the wiring part 71, which is induced by assembling error between the housing 61 and the terminal 4, the electric wire protection part 71f is allowed to prevent the end of the terminal 4 from contacting with the electric wire 5. Therefore, downsizing of the battery connection member 6 contributes reduction of material and mold cost.

It is to be understood the aforementioned embodiment only shows what the present invention typically represents, but the present invention is not limited to the embodiment. Therefore, unless otherwise such changes and modifications depart from the scope of the present invention hereinafter defined, they should be construed as being included therein.

REFERENCE SIGNS LIST 1 battery connection body
2 battery collectivity
3 bus bar
4 terminal
5 electric wire
6 battery connection member
7 electric wire wiring part
61 housing
71 wiring part
71a bottom wall
71b, 71c side wall
71d opening
71e communication part
71f electric wire protection part
72 cover
73 hinge

The invention claimed is:

1. A battery connection member, comprising:
   (a) a plurality of housings accommodating a bus bar connecting in series a plurality of batteries, and one or more terminals electrically connected to the bus bar; and
   (b) a wiring part arranged in parallel along the plurality of housings in a direction intersecting a connecting direction of an electric wire relative to the terminals, wherein the electric wire bent near a swaging part of the terminal is wired within the wiring part, the wiring part including:
      (i) a communication part formed to communicate within the wiring part, and positioning an end of the swaging part of the terminal; and
      (ii) an electric wire protection part including at least one rib continuous with the communication part, and projecting inside the wiring part so as to prevent contact of the terminal positioned in the communication part and the electric wire connected to an other terminal when an end of the terminal projects into the wiring part.

2. The battery connection member as claimed in claim 1, wherein the electric wire protection part is formed plurally in number at both sides of the communication part in an extension direction of the wiring part.

3. A battery connection body attached to a plurality of batteries arranged such that positive and negative electrodes are alternately and oppositely stacked to each other, and connecting in series the plurality of batteries to each other, the battery connection body comprising:
   (a) the battery connection member according to claim 1;
   (b) a plurality of bus bars accommodated in the housing of the battery connection member, and connecting in series the plurality of batteries;
   (c) a plurality of terminals electrically connected to each of the bus bars, and accommodated in the housing;
   (d) one or more additional electric wires electrically connected to the plurality of terminals, and wired inside the wiring part of the battery connection member.

4. A battery connection body attached to a plurality of batteries arranged such that positive and negative electrodes are alternately and oppositely stacked to each other, and connecting in series the plurality of batteries to each other, the battery connection body comprising:
  (a) the battery connection member according to claim 2;
  (b) a plurality of bus bars accommodated in the housing of the battery connection member, and connecting in series the plurality of batteries;
  (c) a plurality of terminals electrically connected to each of the bus bars, and accommodated in the housing; and
  (d) one or more additional electric wires electrically connected to the plurality of terminals, and wired inside the wiring part of the battery connection member.

* * * * *